United States Patent
Sadanaka

(10) Patent No.: US 6,751,197 B1
(45) Date of Patent: Jun. 15, 2004

(54) INFORMATION PROCESSING APPARATUS AND METHOD, AND PROVISION MEDIUM

(75) Inventor: Nobuyuki Sadanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/419,935

(22) Filed: Oct. 18, 1999

(30) Foreign Application Priority Data

Oct. 19, 1998 (JP) ............................................ 10-296498

(51) Int. Cl.[7] .............................. H04B 7/00; H04L 12/56; H04Q 7/20
(52) U.S. Cl. ........................ 370/252; 370/333; 370/349; 370/389; 455/69; 455/522; 714/704
(58) Field of Search ................................ 370/252, 253, 370/280, 329, 332, 333, 335, 342, 349, 389, 395.1, 401, 402, 465; 455/13.4, 38.3, 522, 67.3, 68, 69; 709/223, 224, 238, 253; 710/20, 21, 60, 62; 714/704, 706, 708

(56) References Cited

U.S. PATENT DOCUMENTS

| | | | | |
|---|---|---|---|---|
| 5,878,329 A | * | 3/1999 | Mallinckrodt | 455/69 |
| 5,915,127 A | * | 6/1999 | Ogawa et al. | 395/878 |
| 6,032,261 A | * | 2/2000 | Hulyalkar | 713/400 |
| 6,072,990 A | * | 6/2000 | Agrawal et al. | 455/69 |
| 6,108,561 A | * | 8/2000 | Mallinckrodt | 455/522 |
| 6,219,697 B1 | * | 4/2001 | Lawande et al. | 709/221 |
| 6,259,928 B1 | * | 7/2001 | Vembu | 455/522 |
| 6,341,214 B2 | * | 1/2002 | Uesugi | 455/69 |

* cited by examiner

*Primary Examiner*—Alpus H. Hsu
(74) *Attorney, Agent, or Firm*—Jay H. Maioli

(57) ABSTRACT

In an information processing apparatus for transmitting information to and/or receiving the same from another information processing apparatus via radio communication, the information transmitted from a transmitting node is received by a receiving node, and a bit error rate of the information is counted by an error correction decoder. A host processor recognizes the communication quality on the basis of the bit error rate thus counted. The host processor controls the transmission output level of a transmitting amplifier or controls the modulation mode of a modulator in accordance with the recognized communication quality, whereby the communication quality in such radio communication can be exactly grasped to consequently realize satisfactory communication with a stable quality.

6 Claims, 6 Drawing Sheets

NETWORK SYSTEM

INFORMATION PROCESSING APPARATUS AND METHOD, AND PROVISION MEDIUM

BACKGROUND OF THE INVENTION

The present invention relates to an information processing apparatus, an information processing method and a provision medium, and more particularly to those capable of grasping the quality of communication by recognizing such quality on the basis of received information and controlling the communication quality in accordance with the recognized quality to thereby realize satisfactory communication with the stabilized quality.

It is recently observed that radio communication is in wide diffusion by means of radio LAN (Local Area Network), cellular phone system, PHS (Personal Handyphone System) and so forth.

In such radio communication, however, there exist disadvantages that a satisfactory communication quality is not exactly assured, and bit errors are prone to be caused due to some factors in received data. And in isochronous transfer, an acknowledge signal is not sent back from a receiving node, hence raising a problem that a transmitting node fails to grasp proper reception of the transmitted data.

Also in digital radio communication, some techniques are employed to reduce bit errors by increasing the transmission output in a transmitting node or by lowering the transfer bit rate. However, in isochronous transfer where the reception quality cannot be confirmed in a receiving node, there still exists a problem that the transmission output or the bit rate is not controllable optimally in the transmitting node, as an unnecessarily high output is transmitted or an unnecessarily low transfer rate is adopted for example even in case a satisfactory communication quality is actually achieved.

SUMMARY OF THE INVENTION

It is therefore an object of the present invention to attain improvements adapted for grasping the quality of communication and realizing superior communication with a stabilized quality.

According to a first aspect of the present invention, there is provided an information processing apparatus for transmitting information to and/or receiving the same from another information processing apparatus. The apparatus comprises a receiving means for receiving the information; a communication quality recognizing means for recognizing the communication quality on the basis of the information received by the receiving means; a communication quality information generating means for generating communication quality information on the basis of the communication quality recognized by the communication quality recognizing means; and a transmitting means for transmitting the communication quality information generated by the communication quality information generating means.

According to a second aspect of the present invention, there is provided an information processing method carried out in an information processing apparatus which transmits information to and/or receives the same from another information processing apparatus. The method comprises a receiving step to receive the information; a communication quality recognizing step to recognize the communication quality on the basis of the information received at the receiving step; a communication quality information generating step to generate communication quality information on the basis of the communication quality recognized at the communication quality recognizing step; and a transmitting step to transmit the communication quality information generated at the communication quality information generating step.

According to a third aspect of the present invention, there is provided a provision medium for providing a program, which is readable by a computer to execute a predetermined processing routine, to an information processing apparatus which transmits information to and/or receives the same from another information processing apparatus. The processing routine comprises a receiving step to receive the information; a communication quality recognizing step to recognize the communication quality on the basis of the information received at the receiving step; a communication quality information generating step to generate communication quality information on the basis of the communication quality recognized at the communication quality recognizing step; and a transmitting step to transmit the communication quality information generated at the communication quality information generating step.

According to a fourth aspect of the present invention, there is provided an information processing apparatus for transmitting data information to and/or receiving the same from another information processing apparatus by isochronous packet transfer and asynchronous packet transfer. The apparatus comprises a receiver for receiving the data information by the isochronous packet transfer; a communication quality recognizer for recognizing the communication quality on the basis of the information received by the receiver; a communication quality information generator for generating communication quality information on the basis of the communication quality recognized by the communication quality recognizer; and a transmitter for transmitting, by the asynchronous packet transfer, the communication quality information generated by the communication quality information generator.

And according to a fifth aspect of the present invention, there is provided an information processing apparatus for transmitting data information to and/or receiving the same from another information processing apparatus by isochronous packet transfer and asynchronous packet transfer. The apparatus comprises a transmitter for transmitting the data information to another information processing apparatus by the isochronous packet transfer; a receiver for receiving, by the asynchronous packet transfer, the communication quality information generated on the basis of the communication quality recognized in response to reception of the data information by another information processing apparatus; and a communication quality controller for controlling the communication quality on the basis of the communication quality information received by the receiver; wherein the transmitter transmits the data information with the communication quality controlled by the communication quality controller.

Thus, in the information processing apparatus, the information processing method and the provision medium, information is received, the communication quality is recognized on the basis of the received information, and communication quality information generated in accordance with the recognized communication quality is transmitted to consequently enable exact grasp of the communication quality.

The above and other features and advantages of the present invention will become apparent from the following description which will be given with reference to the illustrative accompanying drawings.

DETAILED DESCRIPTION OF THE PREFERRED EMBODIMENTS

Hereinafter some preferred embodiments of the present invention will be described in detail. In order to clarify the relationship of correspondence between the following embodiments and the means of the present invention defined respectively in the appended claims, the features of the present invention will be mentioned with addition of the corresponding embodiment (one example) in the parentheses posterior to each means.

The information processing apparatus is intended for transmitting information to and/or receiving the same from another information processing apparatus comprises a receiving means (e.g., antenna 18 in FIG. 2) for receiving the information; a communication quality recognizing means (e.g., host processor 11 in FIG. 2) for recognizing the communication quality on the basis of the information received by the receiving means; a communication quality information generating means (e.g., host processor 11 in FIG. 2) for generating communication quality information on the basis of the communication quality recognized by the communication quality recognizing means; and a transmitting means (e.g., antenna 18 in FIG. 2) for transmitting the communication quality information generated by the communication quality information generating means.

The information processing apparatus further comprises a receiving means for receiving communication quality information transmitted from another information processing apparatus; a communication quality control means (e.g., host processor 11 in FIG. 2) for controlling the communication quality on the basis of communication quality information transmitted from another information processing apparatus and received by the receiving means (e.g., antenna 18 in FIG. 2), wherein the transmitting means (e.g., antenna 18 in FIG. 2) transmits the information with the communication quality controlled by the communication quality control means.

The information processing apparatus further comprises a reception confirmatory information generating means (e.g., host processor 11 in FIG. 2) for generating reception confirmatory information indicative of reception of the information by the receiving means, wherein the transmitting means (e.g., antenna 18 in FIG. 2) transmits the reception confirmatory information generated by the reception confirmatory information generating means.

It is a matter of course that the component means described above are not limited to such examples alone.

Figure 1:
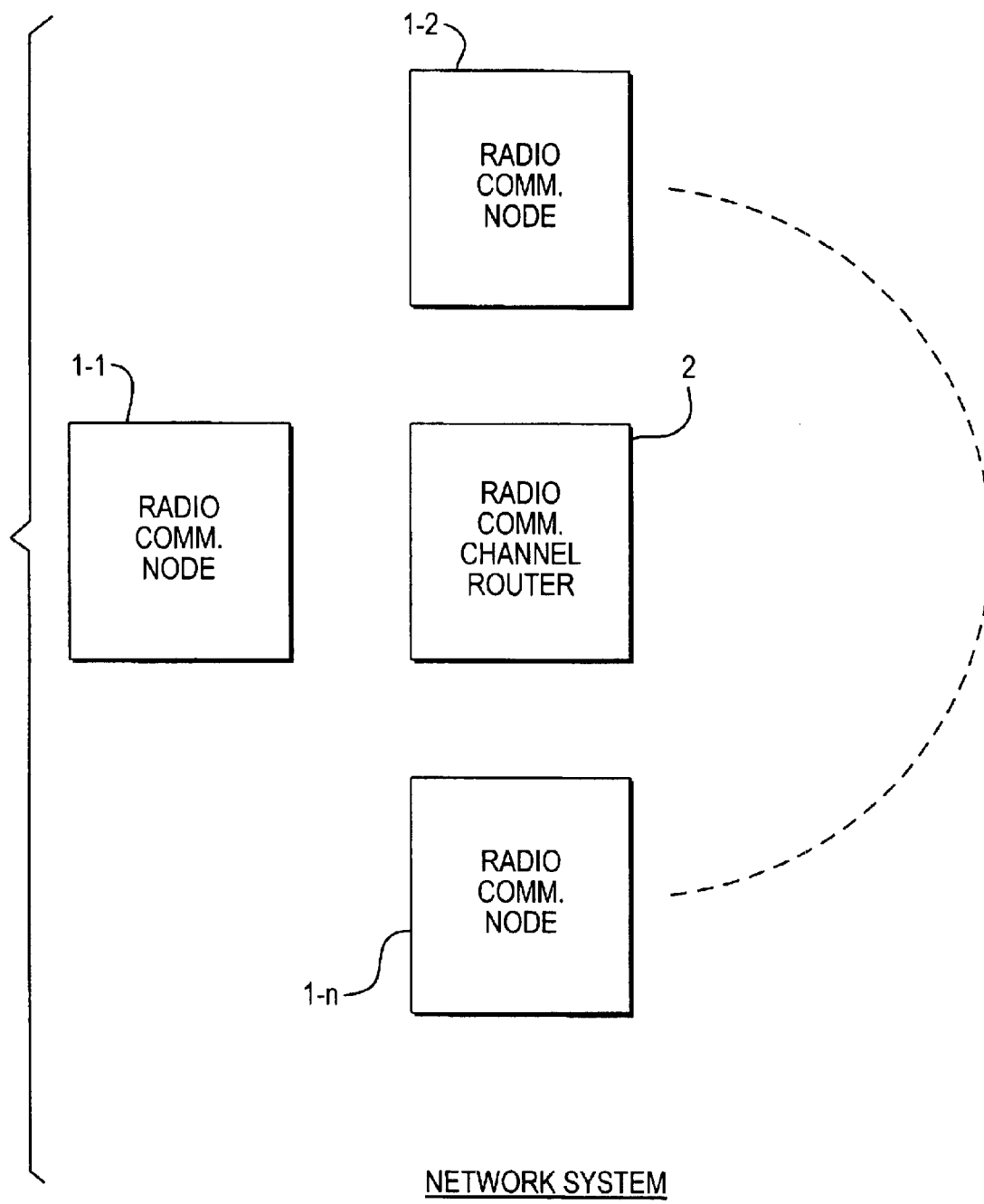
FIG. 1 is a block diagram showing a structural example of a network system where the present invention is applied.

FIG. 1 is a block diagram showing a structural example of a network system where the present invention is applied. The network system of FIG. 1 is so contrived that radio communication is performed by any of nodes 1-1 to 1-n (hereinafter referred to as node 1 when these nodes 1-1 to 1-n need not be distinguished individually) via a router 2 in conformity with the IEEE1394 high-performance serial bus standard, wherein the router 2 manages radio communication channels.

Figure 2:
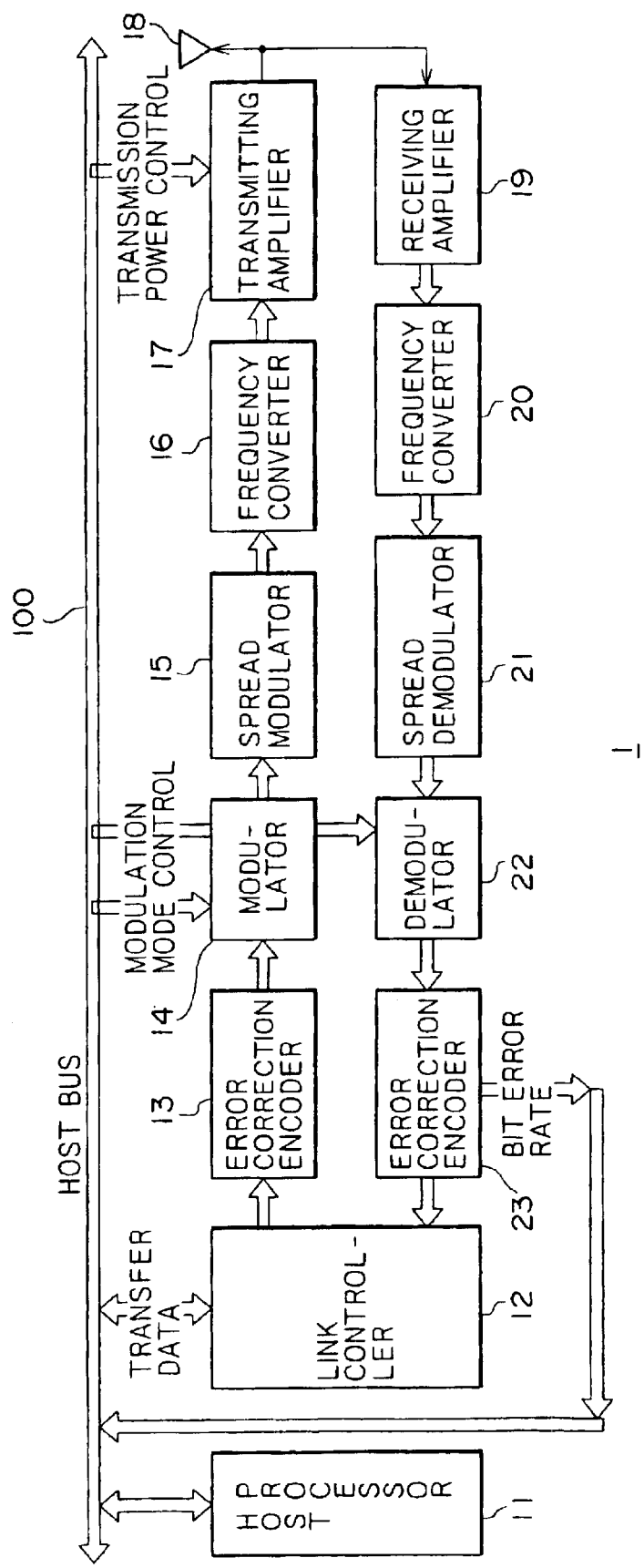
FIG. 2 is a block diagram showing a structural example of a node in FIG. 1.

FIG. 2 shows a structural example of the node 1. A host processor 11 transfers data to a link controller 12 via a host bus 100, or controls the modulation mode of a PSK (Phase Shift Keying) modulator 14, or controls the electric power supplied to a transmitting amplifier 17.

The link controller 12 generates a packet while attaching a header for isochronous transfer of the data supplied from the host processor 11 in conformity with the protocol of the communication channel. An error correction encoder 13 attaches an error correction code to the packet received from the link controller 12, and then executes digital conversion of the data. The modulator 14 modulates the data supplied thereto and is capable of selectively switching, under control of the host processor 11, the modulation mode to either QPSK (Quadrate Phase Shift Keying) modulation or BPSK (Binary Phase Shift Keying) modulation. The structure of this modulator 14 will be described later.

A spread modulator 15 executes spread spectrum modulation of the supplied data. A frequency converter 16 converts the frequency of the supplied data into a transmission frequency. A transmitting amplifier 17 amplifies the supplied data to a predetermined transmission power and then outputs the same to an antenna 18. The antenna 18 serves for transmitting or receiving the data.

A receiving amplifier 19 amplifies the data received by the antenna 18. A frequency converter 20 converts the frequency of the supplied data. And a spread demodulator 21 executes inverse spread spectrum demodulation of the supplied data.

A demodulator 22 demodulates the supplied data and is capable of selectively switching, under control of the host processor 11, the demodulation mode to either QPSK demodulation or BPSK demodulation. An error correction decoder 23 decodes the error correction code of the supplied data and then executes digital demodulation of the data. Thereafter the error correction decoder 23 supplies the input data to the link controller 12 while counting the bit error rate, per predetermined unit such as packet, from the supplied data, and notifies the host processor 11 of the bit error rate via a host bus 100. Subsequently the link controller 12 checks the packet header of the supplied data and makes a decision as to whether the received data is addressed to the node thereof.

Figure 3:
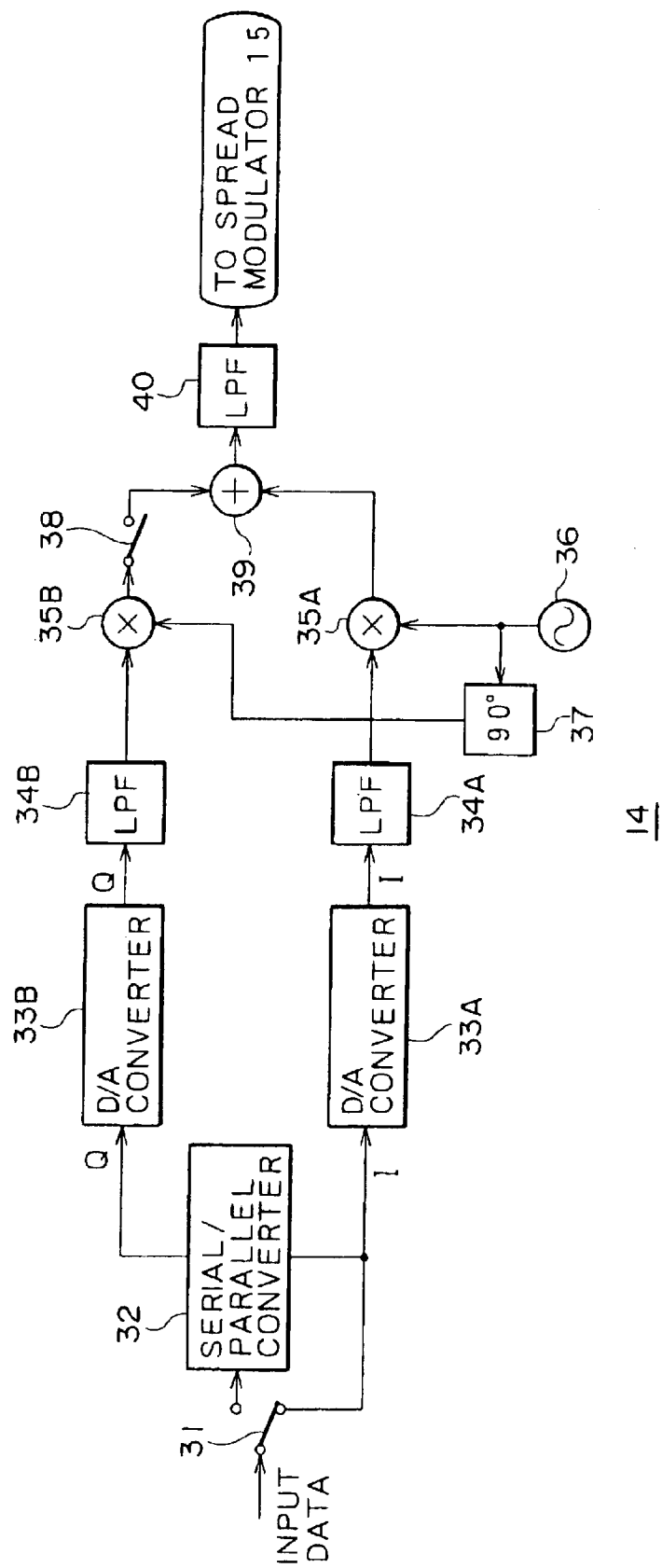
FIG. 3 is a block diagram showing a structural example of a modulator in FIG. 2.

FIG. 3 shows a structural example of the modulator 14. The modulator 14 is so contrived as to be capable of selecting either QPSK modulation or BPSK modulation by changing a switch 31 and a switch 38. The modulator 14 functions as a QPSK modulator when the switch 31 is changed to a serial/parallel converter 32 while the switch 38 is connected to an adder 39. In another case, the modulator 14 functions as a BPSK modulator when the switch 31 is changed to a D/A converter 33A while the switch 38 is disconnected from the adder 39.

The serial/parallel converter 32 converts the input data into one symbol of 2-bit parallel data (0,0), (0,1), (1,0) and (1,1). The I data composed of the most significant bit (MSB) of any symbol is supplied to the D/A converter 33A, while the Q data composed of the least significant bit (LSB) of the symbol is supplied to a D/A converter 33B.

The D/A converter 33A and the D/A converter 33B convert the supplied I data and Q data into analog data respectively, and then supply such data to an LPF (Low Pass Filter) 34A and an LPF 34B respectively. The LPFs 34A and 34B smooth the supplied I and Q data respectively, and then supply the smoothed data to multipliers 35A and 35B respectively.

The multiplier 35A inputs, in addition to the I data, a subcarrier supplied from an oscillator 36. For example, the oscillator 36 generates sine waves, which are then supplied as a subcarrier to the multiplier 35A and a phase shifter 37. The multiplier 35A multiplies the I data by the subcarrier from the oscillator 36, and outputs the result to an adder 39.

Meanwhile the other multiplier 35B inputs, in addition to the Q data, the subcarrier supplied from the oscillator 36 via the phase shifter 37. The phase shifter 37 rotates, by $\pi/2$, the phase of the subcarrier obtained from the oscillator 36, and then outputs the phase-shifted subcarrier to the multiplier 35B. Consequently, the multiplier 35B receives the subcarrier with a phase shift of $\pi/2$ different from the subcarrier supplied to the multiplier 35A. Thereafter the multiplier 35B multiplies the Q data by such phase-shifted subcarrier, and then outputs the result to the adder 39.

The adder 39 adds the outputs of the two adders 35A and 35B, so that an RF (radio frequency) signal is generated as a modulated signal obtained by QPSK modulation of the subcarrier on the basis of the I and Q data. An LPF 40 filters the input RF signal and then supplies the filtered signal to the spread modulator 15.

Figure 4:
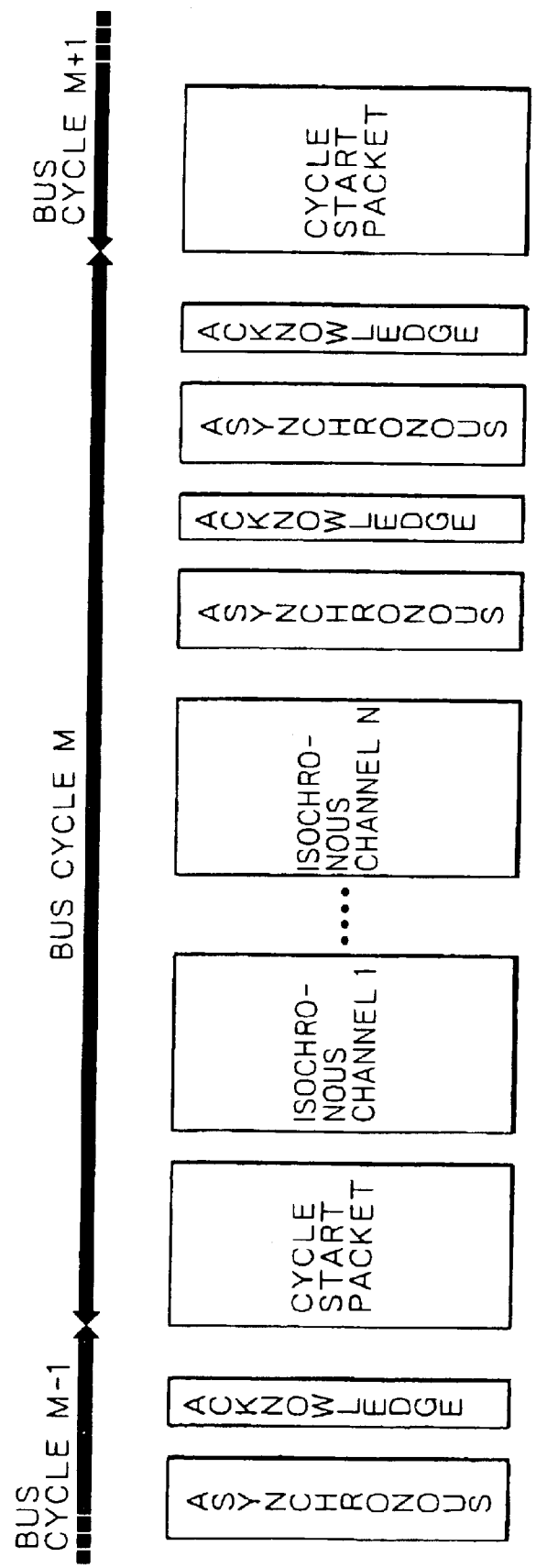
FIG. 4 is an explanatory diagram showing bus cycles.

FIG. 4 shows a structural example of radio bus packets (e.g., data transfer packets in an exemplary case of applying an IEEE1394 high-performance serial bus to radio communication) where both isochronous transfer and asynchronous transfer are coexistent. Packets on each bus cycle consist of a cycle start packet, isochronous packets, asynchronous packets and acknowledge packets. The bus cycles are synchronized at 125 $\mu$sec (8 kHz), and the router 2 begins with a cycle start packet which broadcasts to entire nodes 1-1 to 1-n. Isochronous packets are disposed at a predetermined cycle within a predetermined zone (i.e., time unit) from the top thereof. In isochronous transfer, therefore, transfer of data within a fixed time is assured. However, upon occurrence of any transfer error, there is no means for protection from such error, so that the data are lost. During a time not in use for isochronous transfer in each cycle, any node available for communication sends an asynchronous packet. In asynchronous packet transfer, exact transfer can be assured by the use of an acknowledge packet, but the timing of transfer is not assured.

Next, an explanation will be given on the operation of the network system shown in FIG. 1. It is assumed here that the node 1-1 transmits data, and the node 1-2 receives the data. Therefore the node 1-1 is termed a transmitting node, and the node 1-2 is termed a receiving node.

In the transmitting node, an unshown transmission request generator incorporated in the host processor 11 generates a transmission request signal, and then supplies the signal to an unshown zone acquisition processor incorporated in the host processor 11. The zone acquisition processor inquires of the router 2 whether any zone in the isochronous channel is available or not (whether any idle zone is existent or not). And if the transmitting node is notified from the router 2 that an idle zone is existent in the isochronous channel, the transmitting node makes a reservation for the required zone to thereby secure its channel and ID.

The transmitting node transmits the data to the receiving node. More specifically, the host processor 11 in the transmitting node supplies the data to the link controller 12 via the host bus 100. The link controller 12 generates a packet by attaching a header for isochronous transfer in conformity with the protocol of the communication channel, and then supplies the packet to the error correction encoder 13. Subsequently, the error correction encoder 13 attaches an error correction code to the supplied packet and, after executing digital modulation for transfer, supplies the packet to the modulator 14.

The modulator 14, which is currently switched to QPSK modulation for example by the host processor 11, executes QPSK modulation of the supplied data. More specifically, the data supplied to the modulator 14 is supplied to the serial/parallel converter 32 while being supplied also to the D/A converter 33A. Then the serial/parallel converter 32 converts the input data into one symbol of 2-bit parallel data (0,0), (0,1), (1,0) and (1,1). And the I data composed of the most significant bit is supplied to the D/A converter 33A, while the Q data composed of the least significant bit is supplied to the D/A converter 33B.

The D/A converter 33A and the D/A converter 33B convert the supplied I data and Q data into analog data respectively, and then supply such data to the LPF 34A and the LPF 34B respectively. The LPFs 34A and 34B smooth the supplied I and Q data respectively, and then supply the smoothed data to the multipliers 35A and 35B respectively.

The multiplier 35A inputs, in addition to the I data, a subcarrier supplied from the oscillator 36. For example, the oscillator 36 generates sine waves, which are then supplied as a subcarrier to the multiplier 35A and the phase shifter 37. The multiplier 35A multiplies the I data by the subcarrier from the oscillator 36, and outputs the result to the adder 39.

Meanwhile the other multiplier 35B inputs, in addition to the Q data, the subcarrier supplied from the oscillator 36 via the phase shifter 37. The phase shifter 37 rotates, by $\pi/2$, the phase of the subcarrier obtained from the oscillator 36, and then outputs the phase-shifted subcarrier to the multiplier 35B. Consequently, the multiplier 35B receives the subcarrier with a phase shift of $\pi/2$ different from the subcarrier supplied to the multiplier 35A. Thereafter the multiplier 35B multiplies the Q data by such phase-shifted subcarrier, and then outputs the result to the adder 39.

The adder 39 adds the outputs of the two adders 35A and 35B, so that an RF (radio frequency) signal is generated as a modulated signal obtained by QPSK modulation of the subcarrier on the basis of the I and Q data. The LPF 40 filters the input RF signal and then supplies the filtered signal to the spread modulator 15.

The spread modulator 15 executes spread spectrum modulation of the QPSK-modulated data and then supplies the same to the frequency converter 16. The frequency converter 16 converts the frequency of the supplied data into a transmission frequency, and then supplies the frequency-converted data to the transmitting amplifier 17. Subsequently the transmitting amplifier 17 amplifies the supplied data with a predetermined transmission power and supplies the amplified data to the antenna 18, which then transmits the data supplied thereto. This transmission is performed in the zone of the reserved isochronous channel 1.

The transmitted data is received by the receiving node. More specifically, the antenna 18 in the receiving node receives the data transmitted from the transmitting node, and supplies the received data to the receiving amplifier 19. The receiving amplifier 19 amplifies the supplied data with a predetermined reception power, and then supplies the amplified data to the frequency converter 20. Subsequently the frequency converter 20 converts the frequency of the supplied data and then supplies the data to the spread demodulator 21. The spread demodulator 21 executes spread spectrum demodulation of the supplied data and then supplies the data to the demodulator 22. The demodulator 22, which is currently switched to QPSK demodulation for example, executes QPSK demodulation of the supplied data and then supplies the demodulated data to the error correction decoder 23. The error correction decoder 23 decodes the error correction code of the supplied data and, after executing digital modulation of the data, supplies the same to the link controller 12. The error correction decoder 23 further serves to count the bit error rate of the supplied data per fixed unit such as packet, and supplies the bit error rate to the host processor 11, which then stores the supplied bit error rate.

Figure 5:
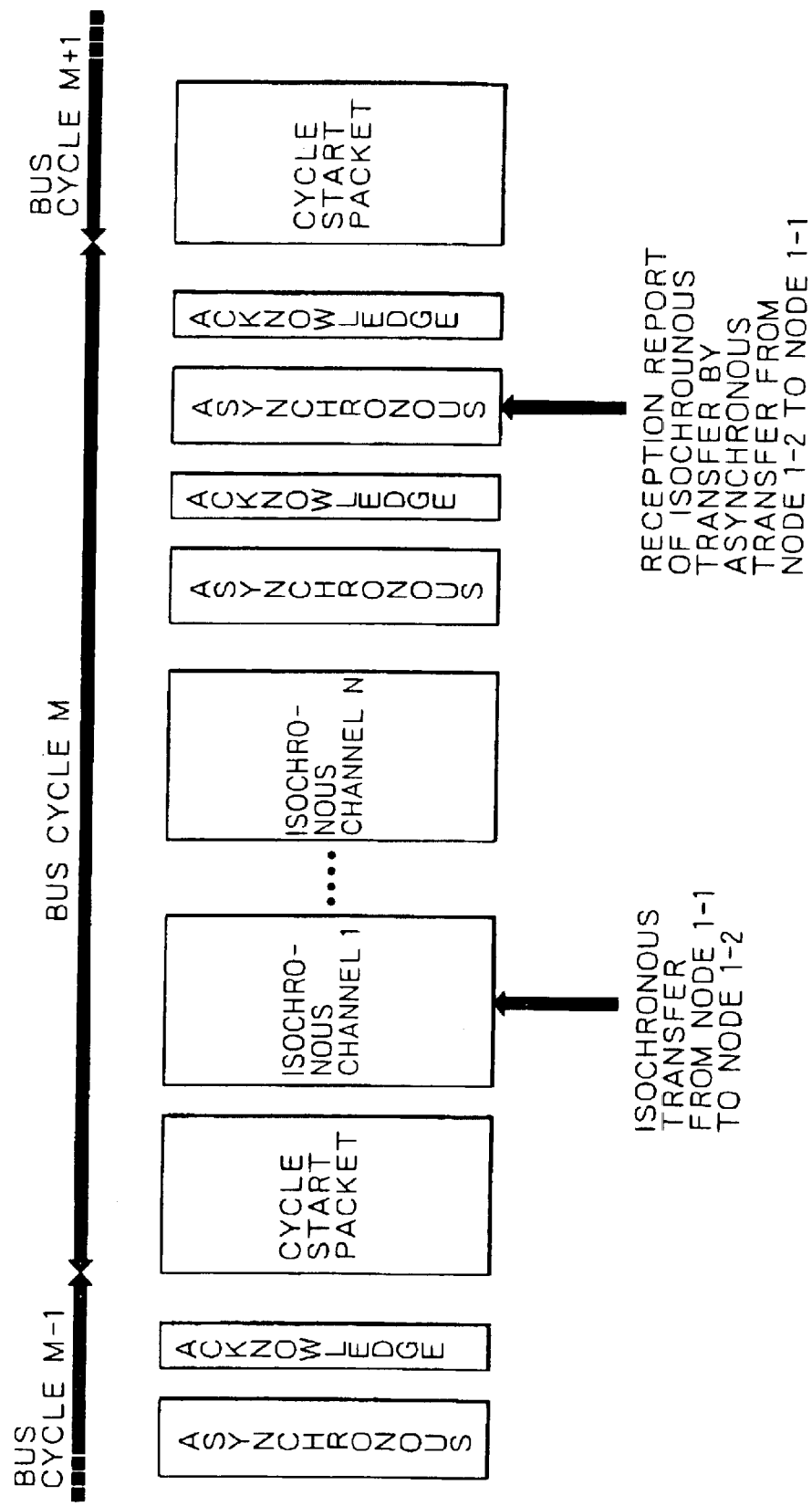
FIG. 5 is another explanatory diagram showing bus cycles.

The link controller 12 checks the packet header of the supplied data and makes a decision as to whether the checked header corresponds to the self node (receiving node) or not, i.e., whether the packet is to be received or not. And if the result of this decision is affirmative to signify that the checked header corresponds to the self node, the receiving node inquires of the router 2 whether any transmission zone for asynchronous transfer is available or not. And when notified by the router 2 that the zone is available, the receiving node makes a reservation for the zone. Thereafter, the receiving node transmits an acknowledge packet in the reserved zone to the transmitting node, as shown in FIG. 5.

The host processor 11 in the receiving node transmits the bit error rate, which has been supplied thereto from the error correction decoder 23, to the transmitting node from the antenna 18 via the aforementioned link controller 12, error correction encoder 13, modulator 14, spread modulator 15, frequency converter 16 and transmitting amplifier 17. Since this transfer is performed in an asynchronous transfer mode, it is not exactly assured that the transfer is completed within the same bus cycle as that of the subject isochronous packet of which reception is to be reported, and such assurance is not necessary either.

The link controller 12 in the receiving node depacketizes the supplied packet to thereby complete the transfer of the isochronous packet from the transmitting node to the receiving node.

Meanwhile the transmitting node receives, by the antenna 18 thereof, the bit error rate transmitted from the receiving node in an asynchronous transfer mode. The bit error rate thus received is then supplied to the host processor 11 via the aforementioned receiving amplifier 19, frequency converter 20, spread demodulator 21, demodulator 22, error correction decoder 23 and link controller 12. The host processor 11 makes a decision as to whether the supplied bit error rate secures a desired communication quality required for the application that handles the data being in the isochronous transfer. And if the result of this decision is negative to signify that the desired communication quality is not secured, the transmission power (transmission level) of the transmitting amplifier 17 is increased, or the transfer rate is lowered to half by switching, e.g., QPSK modulation of the modulator 14 to BPSK modulation, and the isochronous transfer is held continuously. On the contrary, if the result of the decision in the host processor 11 is affirmative to signify that a sufficient margin is kept in the communication quality, the transmission power of the transmitting amplifier 17 is decreased, or the transfer rate is raised to double by switching, e.g., BPSK modulation of the modulator 14 to QPSK modulation.

As described, according to the network system of FIG. 1, communication is performed by first counting the bit error rate from the received data, then recognizing the transmission quality on the basis of the counted bit error rate, and changing the transmission level or the transfer rate in accordance with the recognized communication quality. Consequently, it becomes possible for the transmitting node to grasp the communication quality exactly and to achieve satisfactory communication with a stabilized quality. Further, power saving is attainable in the communication with suppression of any disturbance to the other network, hence realizing efficient utilization of frequency resources.

In the embodiment mentioned above, the bit error rate is sent from the receiving node to the transmitting node in an asynchronous transfer mode. However, it may be so modified as to send a pseudo acknowledge signal, which merely indicates reception of isochronous transfer, to the transmitting node in an asynchronous transfer mode. In this case, the transmitting node being on the isochronous transmission side receives the pseudo acknowledge signal obtained in the asynchronous transfer mode from the receiving node, and then counts the bit error rate of the pseudo acknowledge signal thus received. The transmitting node estimates the quality of communication with the receiving node on the basis of the counted bit error rate. And in case the result of a decision relative to the communication quality signifies that a desired quality is not secured, the transmitting node assures the desired communication quality, which is required in the receiving node, by increasing the transmission level of the transmitting amplifier 17 or lowering the transfer rate to half with switching, e.g., QPSK modulation of the modulator 14 to BPSK modulation. On the contrary, if the result of the decision signifies that a sufficient margin is kept in the communication quality, the transmitting node decreases the transmission level of the transmitting amplifier 17 or raises the transfer rate to double with switching, e.g., BPSK modulation of the modulator 14 to QPSK modulation.

Figure 6:
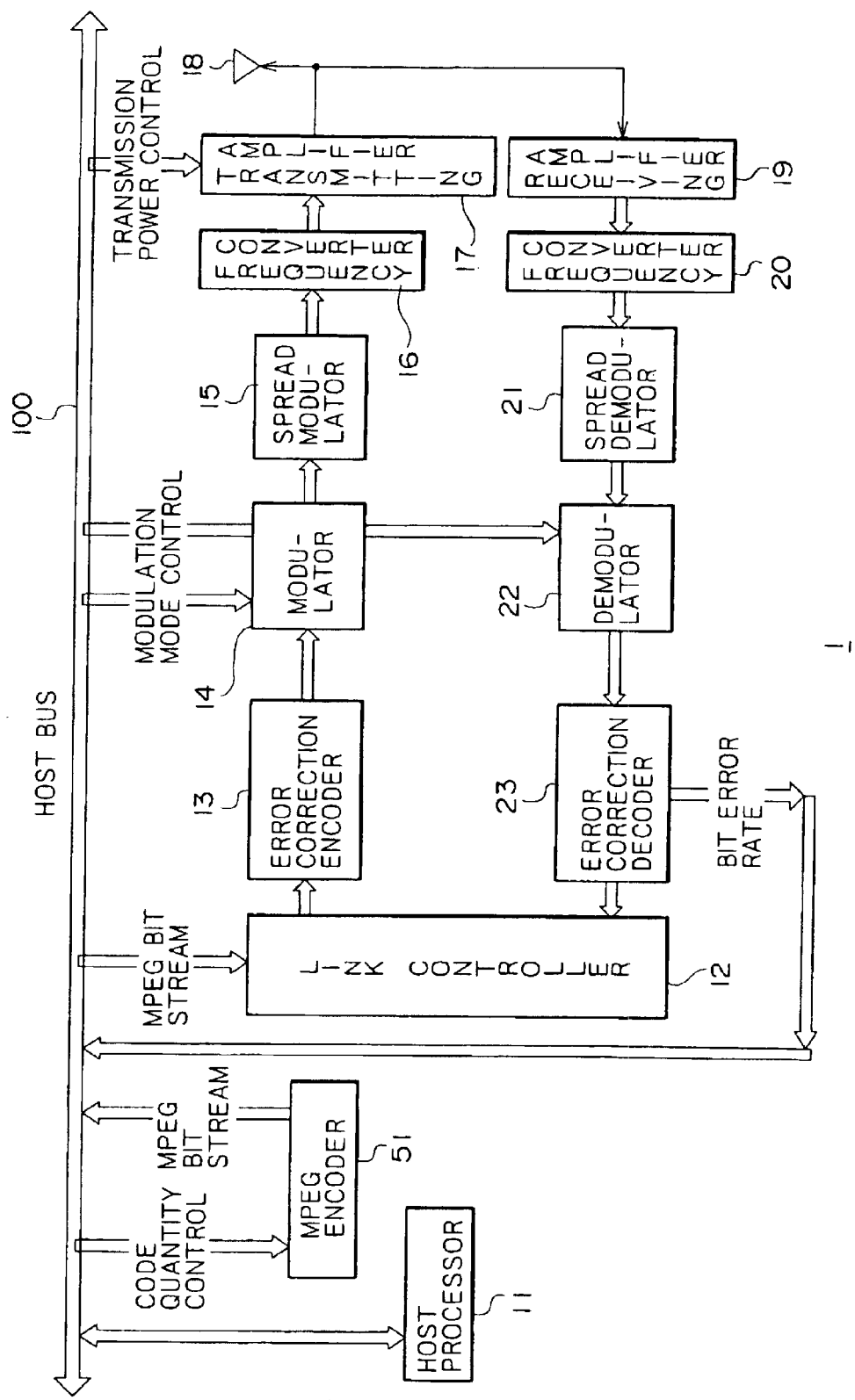
FIG. 6 is a block diagram showing another structural example of the node in FIG. 1.

FIG. 6 shows another structural example of the node 1 where the present invention is applied. The node 1 of FIG. 6 further comprises an MPEG (Moving Picture Experts Group) encoder 51 in addition to the aforementioned configuration of the node 1 in FIG. 2. The MPEG encoder 51 is capable of changing the code quantity of picture data to be generated, in response to a data code quantity control signal supplied from a host processor 11.

Now an explanation will be given on the operation of a network using the node of FIG. 6. The host processor 11 in the transmitting node supplies data, which are to be transmitted, to the MPEG encoder 51. Then the MPEG encoder 51 encodes the supplied data in conformity with the MPEG format and outputs the encoded data to a link controller 12. Subsequently the link controller 12 produces a packet out of the data supplied thereto. The packet thus produced is transmitted via an error correction encoder 13, a modulator 14, a spread modulator 15, a frequency converter 16, a transmitting amplifier 17 and an antenna 18.

The data sent from the transmitting node is received by an antenna 18 of a receiving node, and then is supplied to an error correction decoder 23 via a receiving amplifier 19, a frequency converter 20, a spread demodulator 21 and a demodulator 22. The error detection decoder 23 counts the bit error rate of the data supplied thereto, and then supplies the counted bit error rate to the host processor 11. Subsequently, as in the foregoing case, the host processor 11 sends the bit error rate in the form of an asynchronous packet to the transmitting node.

On the basis of the bit error rate thus sent, the host processor 11 in the receiving node makes a decision as to whether a required communication quality is secured in the communication with the receiving node. And if the result of this decision is negative to signify that the required communication quality is not secured, the host processor 11 outputs to the MPEG encoder 51 a picture data code quantity control signal for securing the required communication quality. Subsequently, the MPEG encoder 51 generates data of a proper code quantity based on the supplied control signal.

As described, according to the network system using the node 1 of FIG. 6, the transmitting node controls the code quantity of picture data to be generated, on the basis of the communication quality, whereby the receiving node is rendered capable of controlling the video (audio) quality on the average to consequently suppress entire or partial failure of the reproduced video (audio) output.

The network system using the node 1 of FIG. 6 is so structured that, when the result of the decision in the host processor 11 signifies no security of the required communication quality, the code quantity of picture data to be generated is controlled on the basis of the communication quality. However, the system may be so modified as to control the output of the transmitting amplifier 17 or to control the modulation mode of the modulator 14, hence realizing satisfactory communication with a further enhanced quality.

Moreover, a stabilized quality is attained in communication by applying the network system of FIG. 1 to some other network such as cellular phone or PHS.

The term "system" employed in this specification denotes an overall system consisting of a plurality of apparatus, devices, means and so forth.

Also in this specification, the recording medium for providing a user with a computer program to execute the above-described processing routine connotes any of information recording media such as magnetic disk, CD-ROM or the like, and also any of transmission media with network such as Internet, digital satellite or the like.

Thus, according to the information processing apparatus, the information processing method and the provision medium of the present invention mentioned above, the information representing the communication quality is transmitted on the basis of the received information to thereby enable exact grasp of the communication quality.

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. An information processing apparatus for transmitting data information to and/or receiving data information from another information processing apparatus by isochronous packet transfer and asynchronous packet transfer, said apparatus comprising:

a receiver for receiving the data information by isochronous packet transfer over a wireless communication channel and including a demodulator for demodulating the received data information and being adapted to be selectively switched between demodulation modes having different transfer rates;

a communication quality recognizer for recognizing a communication quality based on the data information received by said receiver;

a communication quality information generator for generating communication quality information based on the communication quality recognized by said communication quality recognizer, wherein said communication quality information is a bit error rate based on an error correction code contained in the received isochronous packet and the demodulation mode of the demodulator is switched in response to said communication quality information; and a transmitter for transmitting, by the asynchronous packet transfer over the wireless communication channel, the communication quality information generated by said communication quality information generator.

2. The information processing apparatus according to claim 1, wherein said data information is transmitted and/or received by isochronous packet transfer conforming with a wireless IEEE1394 bus standard.

3. An information processing apparatus for transmitting data information to and/or receiving data information from another information processing apparatus by isochronous packet transfer and asynchronous packet transfer, said apparatus comprising:

a transmitter for transmitting the data information to said another information processing apparatus by isochronous packet transfer over a wireless communication channel and including a modulator for modulating the data information to be transmitted and being adapted to be selectively switched between modulation modes having different transfer rates;

a receiver for receiving by the asynchronous packet transfer over the wireless communication channel communication quality information generated based on a communication quality recognized in response to reception of the data information by said another information processing apparatus; and a communication quality controller for controlling the communication quality based on the communication quality information received by said receiver, wherein said transmitter transmits the data information over the wireless communication channel with the communication quality controlled by said communication quality controller, and wherein said communication quality controller controls said modulator to switch between modulation modes based on the communication quality information.

4. The information processing apparatus according to claim 3, wherein said communication quality controller controls a transmission output level of the data information, and said transmitter transmits the data information at the transmission output level controlled by said communication quality controller.

5. The information processing apparatus according to claim 3, wherein said communication quality controller controls an information transmission rate, and said transmitter transmits the data information at the transmission rate controlled by said communication quality controller.

6. The information processing apparatus according to claim 3, wherein said data information is transmitted and/or received by isochronous packet transfer and asynchronous packet transfer conforming with a wireless IEEE1394 bus standard.

* * * * *